United States Patent Office 2,981,729
Patented Apr. 25, 1961

2,981,729
DYESTUFF AND ITS PREPARATION

Martin Luther Kesler, Middlesex, and George Lewis Morgan, Bound Brook, N.J., assignors to American Cyanamid Company, New York, N.Y., a corporation of Maine No Drawing. Filed Oct. 27, 1958, Ser. No. 771,700

2 Claims. (Cl. 260—191)

This invention relates to a novel product, the di-potassium salt of "aminoazobenzene diazotized and coupled to G-acid." More particularly, it relates to a novel method for preparation of the product, to its isolation following the synthesis and to materials colored therewith. "G-acid" is a common name for 2-naphthol-6,8-disulfonic acid. The di-potassium salt of the present invention has the formula

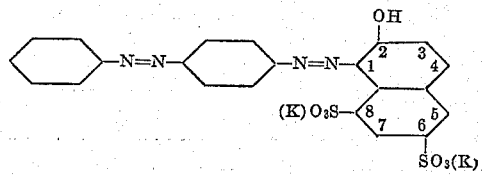

Although the potassium salt is novel, the di-sodium salt obtained by coupling the diazo of p-aminoazobenzene with sodium neutralized 2-naphthol-6,8-disulfonic acid has been available commercially for a number of years. It is usually found under one of several variations of the name Crocein Scarlet (C.I. 252). Under the new system, it is generally designated as Acid Red 73 (C.I. 27,290). These sodium salts generally have been prepared in the following way.

The p-aminoazobenzene is added to water containing hydrochloric acid to form a smooth slurry at about pH one. This slurry is cooled to about 12–15° C. after which sodium nitrite is added. The temperature should not be higher than about 15° C. If so desired, a filter aid such as diatomaceous earth may be stirred into the mixture at this point. In any case, when diazotization is completed, the solution is clarified.

A separate solution is prepared containing the G-salt, sodium carbonate and water and adjusted to a temperature of about minus 2° C. The G-acid may be added per se, in which case it will be neutralized in situ, or it may have been previously neutralized.

Coupling is carried out by slowly adding clarified aminoazobenzenediazo solution to the G-salt solution, while maintaining the temperature at about 0° C., until there is only a slight excess of the G-salt present and the solution has a pH above about seven; or, in other words, is slightly on the alkaline side. Coupling is continued until the tests for excess diazo disappear.

Usually, the above procedure is carried out on an equimolar basis. However, the volumes, concentrations, material balance, times and methods are not absolute and can be varied within fairly wide limits.

Once the dye has been prepared, it is isolated for shipment. This has been done previously by adding some 5–10% sodium chloride by weight, based on the volume of the coupling solution, while maintaining the temperature of about 60° to 65° C., stirring about two hours or until crystal formation substantially ceases. Finally, the crystalline slurry is filtered and dried. The resultant isolated dye usually occurs as extremely fine crystals mixed with large lumps or aggregates of them.

Unfortunately, the product is extremely difficult to handle, due to its excessive dusting tendency. Accordingly, it is usual to add conventional dedusting agents, such as a suitable mineral oil fraction to the product. These may be added at any time during or after the isolation step. However, even such "dedusted" products are not satisfactory in this respect. Moreover, although the product has been quite widely used, for example, in paper and/or coating, the color is not as bright as desired.

Commercially, a similar but brighter product, and if possible not subject to the excessive dusting difficulty, has long been wanted. In an attempt to supply this demand, in the present invention, a method was devised for forming the di-potassium salt. Surprisingly, the resultant product was found to be obtainable in the form of uniform crystals which, if necessary, can be easily dedusted. Not only is it satisfactory from the non-dusting point of view, but even more surprising it was found also to be a completely different type of physical product and to produce unexpectedly and unprecedented brilliance of color when applied to paper.

Physically, the process of the present invention is simply described. In general, the previous practice of preparing Crocein Scarlet, as outlined above, may be followed up to the completion of the coupling step. One notable exception is that the G-acid and sodium carbonate solutions are prepared separately, sodium carbonate being added only after the G-acid or G-salt has been mixed with the acid diazo solution. After coupling is completed, the product is in solution, presumably as the disodium salt.

Another marked distinction is in the mode of product isolation. If the sodium chloride conventionally added at this point to aid in collecting the dyestuff is replaced by potassium chloride, not the sodium salt of the dyestuff but the new di-potassium salt is crystallized out. Moreover, and still more surprising, it is not necessary to replace all of the sodium chloride with potassium chloride. If sufficient potassium chloride to provide the stoichiometric requirements for forming the di-potassium salt is first added and then stirred for a short period, followed by addition of sufficient sodium chloride to complete crystallization, no sodium salts occur in the final product.

The present invention will be more fully illustrated in conjunction with the following examples which are intended for that purpose. Except as otherwise noted, all parts are by weight and temperatures are in degrees centigrade.

In the several examples, certain solutions are used in each. Preparation of these solutions is as follows. In the examples they are referred to by the indicated designations.

"DIAZO" SOLUTION

To 114 parts by volume of water is added 5.7 parts of 20° Bé. hydrochloric acid (1.8 parts real). 19.7 parts of p-aminoazobenzene as its hydrochloride is added with stirring to form a smooth slurry and the volume is adjusted to 375 parts. An additional 8.9 parts of 20° Bé. HCl (2.8 parts real) is added and the slurry is cooled to 12–16°. Then, while maintaining the 12–16° temperature, over a period of 30 minutes is added 7.6 parts of sodium nitrite as a 40% aqueous solution and stirring is continued for about an hour or until diazotization is substantially completed. A pH of one, or less is maintained by adding additional HCl. Thereafter sufficient ice is added to bring the temperature to 0–5°.

"G-SALT" SOLUTION

In 260 parts by volume of water, at about 50°, is dissolved 36 parts of G-salt (M.W. 348).

"CARBONATE" SOLUTION

In about 70 parts by volume of water at about 40° is dissolved 19.7 parts of sodium carbonate and the resultant solution is adjusted with water and ice to 150 parts by volume at 5°–10°.

To obtain, for comparison, a sample of the prior art sodium salt of the dyestuff, the following preparation was carried out.

Example 1

"Coupling" is carried out by adding to the G-salt solution 33 parts of NaCl and adjusting the pH to about 3.5 to 5 by addition of small amounts of HCl or $Na_2CO_3$. Sufficient ice is then added to bring the temperature to 0°–5°. Then, while stirring and maintaining this temperature, the "diazo" solution is added as rapidly as possible, followed by the addition, over about 30 minutes, of the "carbonate" solution. At this point, the pH is about nine. While maintaining about pH 9 and 0°–5° temperature, stirring is continued for about four to five hours or until the test for free diazo becomes negative. An excess of G-salt should be maintained until coupling is substantially completed.

"Clarification" is carried out by heating the slurry from the coupling step to about 60–70° to complete solution of the dye. About 25.4 parts of 20° Bé. HCl (8 parts real) are added to produce a pH (at 25°) of from about 6.2 to about 6.8. About 3.3 parts of a commercial filter aid is added and the slurry is stirred for about 30 minutes at 60–70° C. followed by filtration.

"Isolation" is carried out by adjusting the clarified solution to a pH (at 25°) of from 7 to about 8.5 with sodium carbonate, and adding 10 parts by weight of sodium chloride per hundred parts by volume of solution and stirring for about four hours at 60–70°. Resultant crystals are collected by filtration and dried at about 90–100°. A good yield is obtained.

Resultant collected, dried material is referred to hereinafter as sample A. Physical properties of this sample and others are shown below.

In the foregoing discussions, dedusting with a mineral oil fraction has been noted. One suitable product is available under the designation diesel turbine engine oil, "DTE" oil. It is a mineral oil fraction having a minimum boiling point of 333° C. and Saybolt viscosity of 145–155 at 100° F.; 84–85 at 130° F.; and 43.4 at 212° F. It is a conventionally used material for this purpose, usually to the extent of some 2–5% based on the dyestuff weight. It is used in the following examples. Other products which are similarly used include various polyglycols, oleyl alcohol and butyl alcohol. If added to the dye slurry before filtering and drying, they should be water-insoluble. If added to the isolated product they may be water-soluble.

Example 2

To a sample of dyestuff slurry, obtained as in Example 1, before filtration, 3 parts of antidusting mineral oil per hundred parts of dyestuff is added with stirring. Thereafter the slurry is filtered and the collected solids dried. This product is referred to below as sample B.

Example 3

Example 1 is repeated exactly as to the "coupling" and "clarification" steps. In the "isolation" step an equal weight of potassium chloride is substituted for the sodium chloride. The dried material is referred to hereinafter as sample C. An equally good yield is obtained.

Example 4

Example 2 is repeated, using a portion of dyestuff slurry obtained by the isolation procedure of Example 3. This product is referred to below as sample D.

Example 5

To show the effect of varying the weight of salt added during "isolation," Example 3 is repeated three times, using the identical "coupling" and "clarification" steps. In the three isolation operations, for the 10% KCl of Example 3, there is substituted 5%, 15% and 20% respectively. The products after drying are referred to below as samples E, F and G respectively. Sample E was obtained in lower yield than sample C; samples F and G in about equal yield.

Example 6

Again the procedure of Example 3 was repeated exactly as the "coupling" and "clarification" steps. In the isolating step, however, only 5% of KCl was added. Then after stirring for about four hours, an addition of 5% by weight of NaCl was made and stirring was continued until additional crystallizing stopped. The dried product, referred to below as sample H, was obtained in about the same yield as sample C.

Example 7

To compare the color values of samples produced above, portions of the product dyestuffs were taken up in water and used in a standard calender tinting test on white paper. In each case, an even red tinting is obtained but the brightness varied. A comparison is shown below in Table I.

TABLE I

| Sample | Color | Brightness |
| --- | --- | --- |
| A | Dull Red | Fair to good, not too clean. |
| C | Scarlet | Excellent. |
| E | do | About the same as C. |
| F | do | Slightly duller than C. |
| G | do | Slightly duller than F. |
| H | do | Same as C. |

Example 8

Typical characteristics are shown in the following Table II.

TABLE II

| Property | Sample A(Na) | Sample C(K) |
| --- | --- | --- |
| Crystal Habit | Slender Needles—Very fine sizes—Length 0.5–5.0 microns.[1] | Flat Plates—More Uniform Sizes—Length, 75–100 microns—Width, 25–75 microns. |
| Dichroism | None | Red to Yellow. |
| Birefringence | Lost at 295°–297° C | 305°–330° C. |
| Water Solubility | Poor | Good. |
| Ethanol Solubility | Soluble | Slightly Soluble. |

[1] Many large aggregates.

Industrial use of the sodium salt has always been subject to objectionable dusting. This is particularly when the product has been ground to break up the aggregates. The new salt of this invention is exceptionally free from this difficulty.

Example 9

In order to show the relative freedom from dusting of the di-potassium salt, samples A, B, C and D were submitted to a dusting test in which 75 gms. are dropped through a dust box and the dust collected in a dust drawer. The results are shown in the following Table III.

TABLE III

| Sample: | Percent dust |
| --- | --- |
| A | 0.1941 |
| B (oiled) | 0.0740 |
| C | 0.0687 |
| D (oiled) | 0.0201 |

It will be seen that the use of dedusting oil actually cuts the dust to about one third but that even the untreated potassium salt is better than the treated sodium salt.

The new salt of the present invention is peculiarly unique in its X-ray diffraction pattern. This shown in the following example.

*Example 10*

Samples A, C and H were tested to determine the X-ray powder diffraction patterns, using copper K-alpha radiation of 1.54 Angstroms wavelength obtained by nickel filtering. All had powder diffraction patterns of over thirty-five lines. The interplanar spacing and intensity values of the five strongest lines for sample A are:

| Interplanar Spacing (in Angstroms) | Relative Intensity |
| --- | --- |
| 18.9 | (10.0) |
| 6.29 | 1.8 |
| 4.70 | 0.8 |
| 3.726 | 1.1 |
| 3.657 | 1.1 |

For sample C they are:

| d, (in A) | Relative Intensity |
| --- | --- |
| 20.0 | (10.0) |
| 6.63 | 1.5 |
| 4.97 | 1.4 |
| 4.38 | 0.7 |
| 3.425 | 0.7 |

We claim:
1. In a process of preparing as a dyestuff, the dipotassium salt represented by the formula

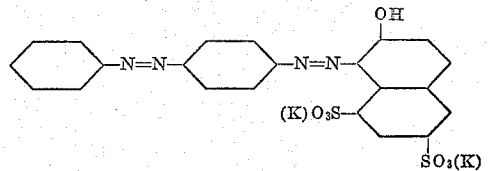

said salt being characterized by an X-ray powder diffraction pattern of over 35 lines, the five strongest lines having relative intensities of 10, 15, 1.4, 0.7 and 0.7 at interplanar spacings in Angstroms of 20, 6.6, 5.0, 4.38 and 3.425, respectively, in which process p-aminoazobenzene is diazotized in acid solution and coupled with 2 napththo-6,8-disulfonic acid, in the presence of sodium carbonate; the improvement which comprises: to an aqueous solution of the coupled product, at a pH from at least 7 to about 8.5, adding potassium chloride in an amount at least stoichiometrically equivalent to the sulfonic groups on the coupled product but not sufficient to produce complete crystallization, stirring resultant mixture, whereby crystallization is initiated, continuing the stirring with the addition of sodium chloride until crystallization substantially ceases and collecting resultant crystals.

2. In a process according to claim 1, the improvement in which no sodium carbonate is present until after the 2-napthtol-6,8-disulfonic acid has been mixed with the acid diazo solution.

References Cited in the file of this patent
UNITED STATES PATENTS
314,939   Hoffman _____ Mar. 31, 1885